United States Patent
Pinder et al.

(10) Patent No.: US 7,860,541 B2
(45) Date of Patent: Dec. 28, 2010

(54) APPARATUS FOR CONVEYING INFORMATION IN A PORTABLE COMMUNICATION DEVICE

(75) Inventors: Ellis A. Pinder, Davie, FL (US); George Mtchedlishvili, Hallandale, FL (US)

(73) Assignee: Motorola, Inc., Schaumburg, IL (US)

( * ) Notice: Subject to any disclaimer, the term of this patent is extended or adjusted under 35 U.S.C. 154(b) by 285 days.

(21) Appl. No.: 11/278,032

(22) Filed: Mar. 30, 2006

(65) Prior Publication Data

US 2007/0232266 A1 Oct. 4, 2007

(51) Int. Cl.
*H04M 1/00* (2006.01)
(52) U.S. Cl. .............. 455/575.7; 455/575.1; 455/559; 455/411; 455/410
(58) Field of Classification Search .............. 455/575.7, 455/575.1, 550.1, 559, 411, 410; 343/702
See application file for complete search history.

(56) References Cited

U.S. PATENT DOCUMENTS

| 5,907,307 | A * | 5/1999 | Bickert et al. ............... 343/702 |
| 6,961,790 | B2 | 11/2005 | Swope et al. |
| 7,149,554 | B2 | 12/2006 | Pinder |
| 7,206,600 | B2 * | 4/2007 | Reece et al. ............. 455/550.1 |
| 7,505,740 | B2 | 3/2009 | Higgins et al. |
| 2005/0049020 | A1 * | 3/2005 | Higgins et al. ............. 455/575.7 |
| 2005/0064905 | A1 * | 3/2005 | Pinder ........................ 455/557 |
| 2005/0090231 | A1 * | 4/2005 | Huberman et al. .......... 455/411 |
| 2005/0162277 | A1 * | 7/2005 | Teplitxky et al. ......... 340/572.8 |

FOREIGN PATENT DOCUMENTS

| WO | 2007117887 A2 | 10/2007 |
| WO | 2007117887 A3 | 10/2007 |

OTHER PUBLICATIONS

Australian IPO Office Action—Jun. 2009—4 pages.
PCT International Preliminary Report Application No. PCT/US2007/064377 Dated Oct. 9, 2008—8 Pages.
PCT International Search Report and Written Opinion Application No. PCT/US2007/064377 Dated Jul. 30, 2008—9 Pages.
Higgins—Non-Final Office Action U.S. Appl. No. 10/649,443 Dated May 12, 2008—21 Pages.
Higgins—Amendment As Filed U.S. Appl. No. 10/649,443 Dated Nov. 10, 2008—10 Pages.
DS2431 1024-Bit, 1-Wire EEPROM—25 Pages. http://datasheets.maxim-ic.com/en/ds/DS2431.pdf.

* cited by examiner

*Primary Examiner*—Ajit Patel
*Assistant Examiner*—Khai M Nguyen
(74) *Attorney, Agent, or Firm*—Barbara R. Doutre

(57) ABSTRACT

A portable communication device (100) includes a radio (102) and RF memory key (104) that allows both RF and baseband signals to be transported over the radio antenna port. A single wire memory device (134) is embedded into RF memory key (104) along with frequency diplexing circuitry (116) to transport single wire bus communications between the radio (102) and RF memory key (104) while RF is passed from the radio (102) to an antenna (150).

25 Claims, 2 Drawing Sheets

APPARATUS FOR CONVEYING INFORMATION IN A PORTABLE COMMUNICATION DEVICE

RELATED APPLICATIONS

The invention is related to U.S. Publication No. 20050049020 entitled "System and Method for Antenna Identification and Control", published on Mar. 3, 2005 and U.S. Pat. No. 7,149,554 entitled "Access Control Method Utilizing a Key Battery", granted on Dec. 12, 2006, commonly assigned to Motorola, Inc.

FIELD OF THE INVENTION

The present invention relates generally to two-way portable communication devices and more particularly to a means for conveying user identity, radio and access control information in such devices.

BACKGROUND

Portable communication devices, such as hand-held two-way radios, are often shared by multiple users. Certain aspects of radio operation are identity-dependent and thus associated with the actual user of the radio. For example, a user wishing to make a radio-to-radio private call needs to have his or her identity known by the radio and/or the radio system. However, a radio identifier is not sufficient if the radios are shared amongst multiple users. Additionally, certain user configuration information or operational preferences may be associated with the individual user.

It is desirable for such user and configuration information to be able to move with the individual, regardless of the actual radio being used. It is undesirable to reprogram the radio when a user changes radios, because such operation is inconvenient and programming equipment may not be readily available. Having the user enter the data can also be prone to error, tampering, and is limited by the amount of information a user can remember. While it is reasonable for a user to remember a user ID, it is unlikely that a user will recall system or frequency information and be capable of manually entering this information each time a new radio is used.

For certain radio environments, such as the public safety environment, it may also be desirable to restrict access to certain features or capabilities of the radio. For example, certain features or capabilities may only be appropriate for users with special training or having a certain level authority. It is impractical to control access to special features of each device by configuring each device differently as this requires a personal computer (PC), software, and customized cables. As can be easily recognized, this process is both time-consuming and inconvenient.

The need to easily enable or disable special functionality in the field is very important. An example of such need is a two-way radio with front panel programming (FPP) capability. Such a radio is capable of being programmed directly using the radio's own keypad and display. Since a commercial two-way radio is capable of transmitting on a large number of frequencies, including those used by police and public safety agencies, it is desirable to restrict access to the front panel programmable feature to minimize the impact of a malicious user.

The enabling/disabling functionality can be implemented via password protection and/or a hardware key. While combining a hardware key with a password scheme offers enhanced security it also has a number of disadvantages. These disadvantages include: 1) altering the form factor of the device and/or increasing its size, potentially making it less comfortable to use; 2) changes in industrial design or electrical interface in successive products may preclude the re-use of the hardware key; and 3) the key requires the addition of a connector on the radio, or the key occupies an existing connector that can no longer be used for other purposes while the key is present.

Accordingly, there is a need for an improved way of moving user identity information and/or radio configuration information from one radio to another without the use of programming equipment. It is further desirable to have an access control mechanism to control access to restricted functionality of a portable communications device. Such access control mechanism should be inexpensive to design and manufacture, minimally impact the form factor of the communication device, and yet provide secure access.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
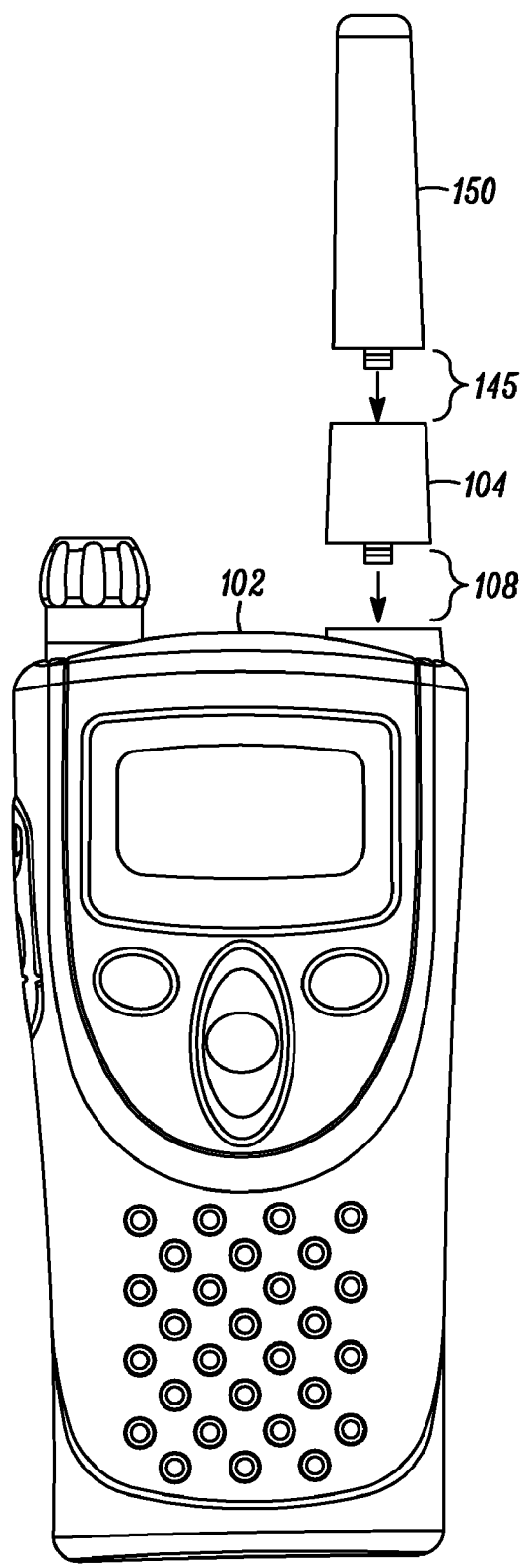
FIG. 1 is a portable communication device formed in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein an apparatus that provides an unambiguous means for a portable communication device, such as a handheld two-way radio, to read information via a radio frequency (RF) memory key attached to an antenna port of the portable device. User identity information and/or radio configuration information associated with a specific radio user can now be easily conveyed to the radio by simply having the user attach the RF memory key to the antenna port. Additionally, the RF memory key of the present invention can further provide access control to restricted local radio functionality, thus providing a hardware security key that can be used on a variety of radio form factors. While the present invention will be described in terms of a portable two-way radio, other portable communication devices having removable antennas can also derive benefit from the apparatus of the present invention.

Figure 2:
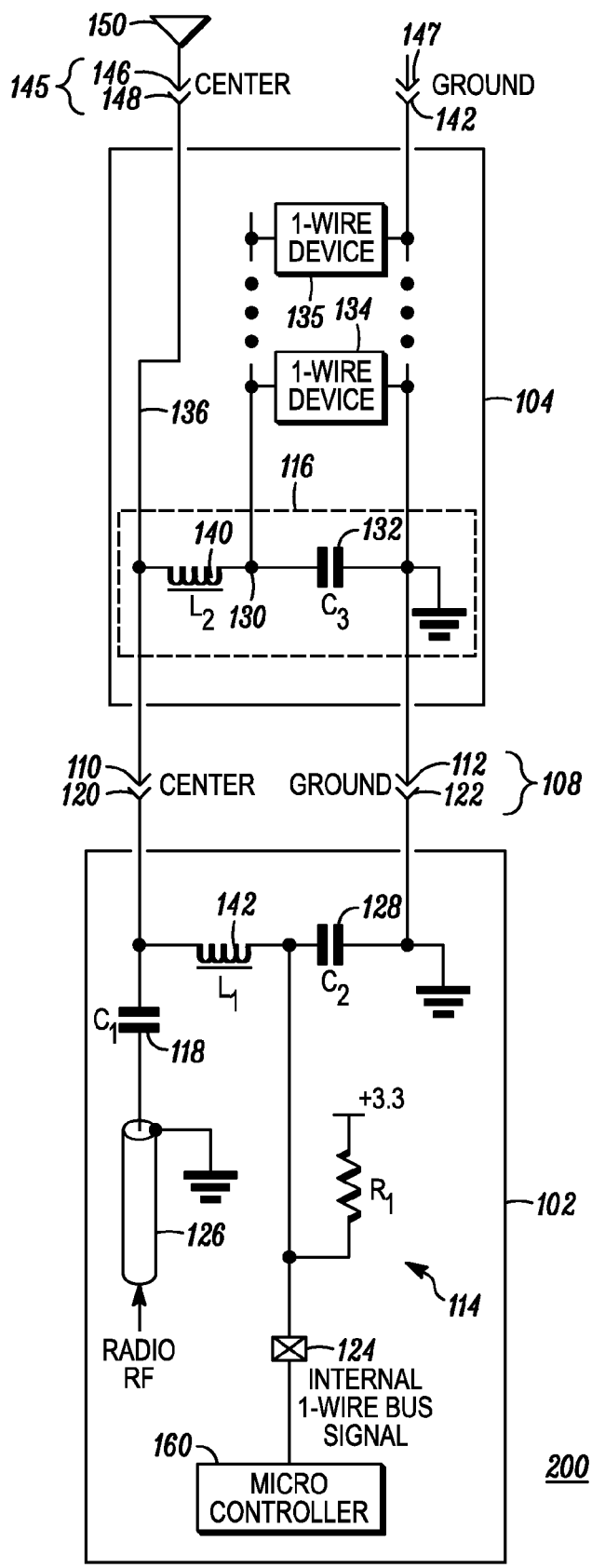
FIG. 2 is an electrical block diagram of FIG. 1 including an RF memory key providing radio frequency (RF) transport, information conveyance and/or access control in accordance with the present invention.

FIG. 1 is a portable communication device 100, such as a portable two-way radio, and FIG. 2 is a corresponding electrical block diagram 200 in accordance with the present invention. Portable communication device 100 and electrical block diagram 200 provide information conveyance and RF transport between a radio 102 and RF memory key 104 formed in accordance with the present invention. Referring to both FIGS. 1 and 2, RF memory key 104 couples radio 102 to removable antenna 150. RF memory key 104 includes a single wire bus interconnect for coupling to radio 102. In accordance with the present invention, single wire bus communication circuitry is incorporated into RF memory key 104 including one or more single wire memory devices 134, 135. In accordance with the present invention, at least one memory device 134 includes information such as user identity information, radio configuration information, and/or access control information to access local device functionality.

In accordance with the present invention, the single wire bus circuitry interconnects a single bus master, provided by microcontroller 160 in radio 102, to one or more slaves provided by single wire memory devices 134, 135 in RF memory key 104. The single wire bus has a single line in addition to ground and each device on the bus is able to drive it at the appropriate time. One wire systems, such as available from Dallas Semiconductor, can be incorporated into the configuration of the present invention.

Removable antenna 150 includes a connector, such as a coaxial connector, having an antenna center conductor 146 and antenna ground 147 which normally couple to radio 102 via a standard radio antenna port formed of radio center conductor 120 and radio ground 122. In accordance with an embodiment of the invention, however, antenna 150 couples to RF memory key 104 via first interconnect 145. First interconnect 145 is formed of the antenna center conductor 146 and antenna ground 147 on the antenna side and RF memory key center conductor 148 and RF memory key ground 142 on the RF memory key side. RF memory key 104 couples to radio 102 via second interconnect 108. Second interconnect 108 is formed of a second RF memory key center conductor 110 and a second RF memory key ground 112 on the RF memory key side and the radio center conductor 120 and the radio ground 122 on the radio side. First interconnect 145 thus provides a first coaxial connection coupling the removable antenna 150 to the RF memory key 104 while second interconnect 108 provides a second coaxial connection coupling the RF memory key 104 to the radio 102. First and second interconnects 145, 108 thus provide a pass-through for RF from the radio through the RF memory key 104 to removable antenna 150. Alternatively, the RF memory key 104 can be integrated within the removable antenna 150.

In accordance with the present invention, radio 102 includes electronic circuitry 114 for diplexing RF and baseband signals, and RF memory key 104 includes electronic circuitry 116 for diplexing the RF and baseband signals. In accordance with the present invention, the RF memory key 104 provides a transport for RF signals and access to memory devices 134, 135 by baseband signals. The RF signals are used for regular transmit and receive radio operation, and the baseband signals which generated from the single wire bus 124 are used for accessing user identity, radio and/or access control information stored in the memory devices 134, 135.

The electronic circuitry which accomplishes the frequency division filtering is implemented as follows. On the radio side 102, a radio frequency (RF) signal 126 is capacitively coupled, through capacitor 118, to the radio center conductor 120. The capacitive connection is designed to pass, with high efficiency, the high frequency RF signals while blocking baseband signals. The single wire bus 124 is DC coupled to the connector center conductor 120 through an RF blocking inductor, L1, 142. Inductor 142 has negligible impedance to the frequency of single wire bus signals, but provides very high impedance at RF frequencies to prevent loading of the RF path. Capacitor, C2, 128 further prevents any residual RF from entering the single wire bus 124 by providing a low impedance short to RF signals while not substantially loading the low frequency baseband signals. This frequency division filtering for interconnection is commonly known as diplexing.

On the RF memory key side, the RF and baseband signals are separated once again using a means similar to the intermixing done in radio 102. Inductor L2, 140 prevents RF from entering single wire bus node 130 by presenting a high impedance at RF frequencies, while at the low single wire baseband frequencies, inductor L2 140 allows the baseband signals to pass. Capacitor C3 132 removes residual RF from the single wire bus node 130 without substantial loading of the single wire bus signals.

The result, in accordance with the present invention, is transport of both the RF signal and the single wire bus signal across the same single interconnect 108 normally used for the antenna feed. RF signal 136 is transported to interconnect 145, which provides connection to antenna 150. In accordance with the present invention, interconnect 145 provides RF connectivity to antenna 150 through RF memory key 104 and filtering of RF memory key 104 prevents the single wire baseband frequencies from passing to antenna 150. Again, one or more single wire memory devices 134, 135 are used to store information to be accessed by microcontroller 160. Other components, such as other RF bypass capacitors, may be included as well depending on the antenna design.

In an alternative embodiment, a plurality of stacked RF memory keys 104 can be stacked in between the removable antenna 150 and radio 102. In these types of applications, the baseband signals would be allowed to pass through RF memory key 104 to interconnect 145 to allow access to the memory devices contained in the additional keys.

In accordance with an embodiment of the invention, at least one of the single wire memory devices 134, 135 is manipulatable by the radio 102, via microcontroller 160. Also, at least one of the single wire memory devices 134, 135 can be used to manipulate operation of the radio 102.

Incorporation of single wire bus communications into the radio 102 allows the single wire memory device 134, such as an EEPROM, to be contained within the RF memory key 104. In accordance with a first embodiment of the invention, single wire memory device 134 may be programmed with user identity information, user configuration information, and/or user preferences. In this embodiment, some portion of the information is logically associated with a specific radio user.

In the first embodiment, the single wire memory device 134 in RF memory key 104 contains user identity information, user configuration information, and/or user preferences. This information would likely include a user identification number for identifying a user for selective calling or paging, identifying a user for radio system access, and/or identifying a user for phone interconnect. Those skilled in the art will recognize there are additional usage cases for establishing a unique user identity for usage in a two-way radio. Additionally, the single wire memory device 134 may contain additional configuration information, such as radio system information, radio personality information, conventional channel information, channel assignments, scan lists, etc. User preference information may also be included, such as programmable scan lists, phone lists, backlight timers, keypress beep enable, etc. The user identity information, the user configuration information, and the user preferences, if present and used in aggregate, may be recognized to be a complete radio "codeplug". In this first embodiment, the information stored in single wire memory device 134 may represent a complete radio codeplug or simply a portion thereof.

The information stored in single wire memory device 134 of RF memory key 104 may be required for radio operation, meaning that the user identity, radio configuration information, and/or user preference information is required for radio operation. Hence, the absence of RF memory key 104 would render the radio inoperable or substantially limited in capability.

Alternately, the information stored in single wire memory device 134 of RF memory key 104 may be used to supplement the radio's codeplug. The radio would have a "default" configuration that allows basic operation without individual identity or with a default identity. Addition of the RF memory key 104 would provide the radio with additional information that would extend, enhance, or customize the default configuration according to the content of the user identity and configuration information. In one example, the RF memory key 104 may merely provide user identify information, which would be used to make a radio with a generic codeplug specific to an individual so long as the RF memory key 104 were attached. In another example, the RF memory key 104 may provide user identify information and add additional trunking systems, radio personalities, and/or conventional channels beyond what is specified in the generic radio codeplug. The present invention allows for the radio to alter the contents in single wire memory device 134 to store new user preferences or for reprogramming.

In accordance with a second embodiment of the invention, the single wire memory device 134 is programmed with access control information to enable access to local radio functionality. In this second embodiment, there is no logical association or coupling between a specific RF memory key and a specific user.

In the second embodiment of the invention, the RF memory key 104 is used to enable access to restricted, latent, and local radio functionality. The radio firmware contains a set of features or capabilities that are restricted and may only be accessed by means of a hardware key. On a radio without an RF memory key 104 attached, the set of restricted features are non-operable and their existence may even be hidden. On a radio with the RF memory key 104 attached, in accordance with this second embodiment, one or more of the set of restricted features may be authorized by data contained in the single wire memory device 134 contained in RF memory key 104. The information contained within the memory device 134 contains one or more flags or security keys that enable access to latent radio functionality. A single key or flag may enable access to all restricted functionality, or there may be a separate key or flag associated with each specific capability. Those skilled in the art will recognize that it may be advantageous to encrypt or digitally sign the keys to increase security and thwart attempts to inappropriately activate the restricted functionality or to create imitation hardware keys.

The first embodiment of the invention thus includes or allows user identity information to be included in the data stored in the single wire memory device 134. The second embodiment, in contrast, contains no user identity information whatsoever. A likely usage case of the second embodiment is to enable front panel programming (FPP) operation of a portable two-way radio.

To further illustrate this point, an analogy can be made to a set of identical deadbolt locks protecting multiple rooms and set of identical keys that operate all of the deadbolt locks. A set of authorized people need access to all of the rooms, and each of these people are given a key. The keys can be randomly assigned to each person, but each person will still be able access all the rooms. A restricted feature in each radio is analogous to a room, the access control mechanism is analogous to the deadbolt lock, and the RF memory key containing a flag or security key is analogous to the deadbolt key. Any radio user who physically possesses an RF memory key is permitted to access the restricted functionality on any radio to which it is attached. The individual's identity is not important; all that matters is whether the person possesses a key.

It is also possible to have the first and second embodiments combined such that user identity and radio configuration information is incorporated along with access control. In this third embodiment, only specific predetermined users with appropriate identification would be able to use the radio and even these specific users would have different levels of access to restricted functionality.

Though the single wire bus 124 is provided to allow communications with a single wire memory device 134, such as an EEPROM, additional memory devices 135 can be used for additional storage space. Those skilled in the art will recognize that if a single memory device does not meet the storage needs of the particular application, that "n" memory devices can be used and mapped accordingly so that they appear as or are ultimately processed as a single contiguous bank of memory.

Today's communication devices are equipped with an antenna removably coupled to the radio's antenna port. The RF memory key of the present invention can take advantage of the existing antenna interconnect, be it coaxial or other type, along with circuitry within the radio and antenna to enable both RF and single wire bus communications via a single port, the radio antenna port.

Accordingly, there has been provided an RF memory key that provides an unambiguous means for a radio to retrieve and process user identity information, user configuration information, and user preference information stored in one or more memory devices of the RF memory key. The apparatus of the present invention provides increased operating versatility by providing a user a means to easily migrate personal information among a plurality of different radios, possibly including different radio form factors, without the need for specialized programming equipment. The RF memory key is small, unobtrusive, and its "pass through" nature avoids the consumption of a valuable radio interface port.

The RF memory key of the present invention can further provide an access control mechanism used to access restricted, local, latent radio functionality to authorized individuals who possess the RF memory key. This aspect of the invention meets Federal Government requirements for a hardware access control mechanism for the front panel programming capability of two-way radios.

The RF memory key of the present invention is inexpensive to design and manufacture, minimally impacts the form factor of the radio, and does not prevent the use of accessories or other capabilities. The user need not enter data or reprogram the radio each time a new radio is used. The portable radio is less prone to programming error or tampering by outsiders. The RF memory key does not require the addition of a connector on the radio as it is embodied as an extension to the removable antenna or can even be integrated within the removable antenna.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus, comprising:
a radio frequency (RF) memory key formed of diplexing circuitry and memory, the RF memory key storing specific personal radio user information within the memory, the RF memory key transporting RF signals between a radio and removable antenna, and the RF memory key transporting baseband signals to and from the memory while blocking RF signals to the memory thereby migrating the specific personal radio user information to the radio.

2. The apparatus of claim 1, wherein the RF memory key is removably coupled between the radio and the removable antenna.

3. The apparatus of claim 2, wherein the RF memory key includes a first coaxial interface for coupling to the radio and a second coaxial interface for coupling to the removable antenna.

4. The apparatus of claim 2, wherein the RF memory key is removably coupled amongst a plurality of different radios to migrate the specific personal radio user information amongst the plurality of different radios.

5. The apparatus of claim 1, wherein a plurality of RF memory keys are stacked between the radio and the removable antenna.

6. The apparatus of claim 1, wherein the memory within the RF memory key comprises at least one single wire memory device that interoperates with single wire bus communications within the radio.

7. The apparatus of claim 6, wherein the at least one single wire memory device is operatively coupled to the first coaxial connector.

8. The apparatus of claim 6, wherein the at least one single memory wire device is manipulatable by the radio.

9. The apparatus of claim 6, wherein the at least one single wire memory is used to manipulate operation of the radio.

10. The apparatus of claim 1, wherein the RF memory key is integrated within the removable antenna.

11. The apparatus of claim 1, wherein the specific radio user information comprises at least one of: radio user identity information, radio configuration information associated with a specific radio user, and user preference information.

12. The apparatus of claim 1, wherein the memory comprises an EEPROM.

13. The apparatus of claim 1, wherein the RF memory key further provides access to at least one radio functionality using the specific radio user information present in the memory.

14. A radio, comprising:
radio electronic circuitry for diplexing RF and baseband signals;
an antenna port;
a removable antenna; and
a radio frequency (RF) memory key coupled to the antenna port of the radio, the RF memory key including:
a memory for storing specific personal radio user information; and
electronic circuitry for diplexing the RF and baseband signals such that the RF signals are transported to and from the removable antenna and blocked from the memory and the baseband signals are transported to and from the memory thereby migrating the specific personal radio user information to the radio.

15. The radio of claim 14, wherein the RF memory key includes at least one single wire memory device.

16. The radio of claim 15, wherein the specific radio user information comprises at least one of: radio user identity information, radio configuration information associated with a specific radio user, and user preference information.

17. The radio of claim 16, wherein the specific radio user information comprising at least one of: radio user identity information, radio configuration information associated with a specific radio user, and user preference information is migrated amongst a plurality of different radios by removably coupling the RF memory key to amongst the plurality of different radios.

18. The radio of claim 14, further comprising a plurality of RF memory keys coupled between the radio antenna port and the removable antenna.

19. The radio of claim 14, wherein RF memory key is integrated within the removable antenna.

20. The apparatus of claim 14, wherein the RF memory key further provides access to at least one radio functionality using the specific radio user information present in the memory.

21. The apparatus of claim 14, wherein the RF memory key provides the radio user specific information via the baseband signals.

22. An apparatus, comprising:
a radio frequency (RF) memory key formed of diplexing circuitry and memory, RF memory key for storing access control information within the memory, the RF memory key transporting RF signals between a radio and removable antenna, and the RF memory key transporting baseband signals to and from the memory while blocking RF signals to the memory, the access control information being transported via the baseband signals providing authorized user access to restricted functionality of the radio.

23. The apparatus of claim 22, wherein the RF memory key further authorizes access to at least one restricted radio functionality using the access control information present in the memory.

24. The apparatus of claim 22, wherein the RF memory key allows front panel programming capability of a two-way radio via the access control information.

25. The apparatus of claim 22, wherein the access control information stored within the RF memory key accesses restricted, local radio functionality, without the use of a hardware key, to authorized users having the RF memory.

* * * * *